United States Patent
Lins et al.

[11] Patent Number: 5,772,372
[45] Date of Patent: Jun. 30, 1998

[54] SPREADING ANCHOR

[75] Inventors: Reinhard Lins, Sevelen, Switzerland; Erich Wisser, Bregenz, Austria; Helmut Gassner, Triesenberg, Liechtenstein; Susanne Kossian, Feldkirch, Austria; Rainer Kussmaul, Thüringen, Austria; Hermann Beck, Feldkirch-Tisis, Austria; Markus Hartmann, Feldkirch, Austria

[73] Assignee: Hilti Aktiengesellschaft, Schaan, Liechtenstein

[21] Appl. No.: 822,568

[22] Filed: Mar. 19, 1997

[30] Foreign Application Priority Data

Jun. 5, 1996 [DE] Germany .................. 196 22 544.2
Jul. 1, 1996 [DE] Germany .................. 196 26 308.5

[51] Int. Cl.⁶ .................................................. F16B 13/06
[52] U.S. Cl. ................. 411/55; 411/51; 411/60; 411/71
[58] Field of Search ................... 411/30, 31, 50, 411/51, 55, 60, 71, 72

[56] References Cited

U.S. PATENT DOCUMENTS 4,702,654  10/1987  Firschmann et al. ............... 411/31
4,818,163   4/1989  Bereiter et al. ................... 411/54 X
4,898,505   2/1990  Froehlich .......................... 411/72 X
4,984,945   1/1991  Bergner ............................ 411/55 X

FOREIGN PATENT DOCUMENTS 104723  4/1984  European Pat. Off. ............. 411/31

*Primary Examiner*—Neill R. Wilson
*Attorney, Agent, or Firm*—Anderson, Kill & Olick, P.C.

[57] ABSTRACT

A spreading anchor including an anchor rod (2) having a stem (12) provided at its front end, when viewed in a setting direction, with a cone (3) widening outwardly towards its free end and a longitudinally displaceable sleeve (4) pushed over the anchor rod (2) and having at a front end (8) cutting tabs (5) which are provided with cutters, are separated from each other by gaps, extend from a plastic hinge (11) toward the cone (3), and are spread radially upon sliding of the sleeve (4) over the cone (3), the sections of the cutting tabs (5), which extend from free ends thereof in a direction toward the plastic hinge (11), having an outer surface (6) remote from the cone (3) and formed at least in their cutting region thereof as a substantially toroidal surface.

8 Claims, 3 Drawing Sheets

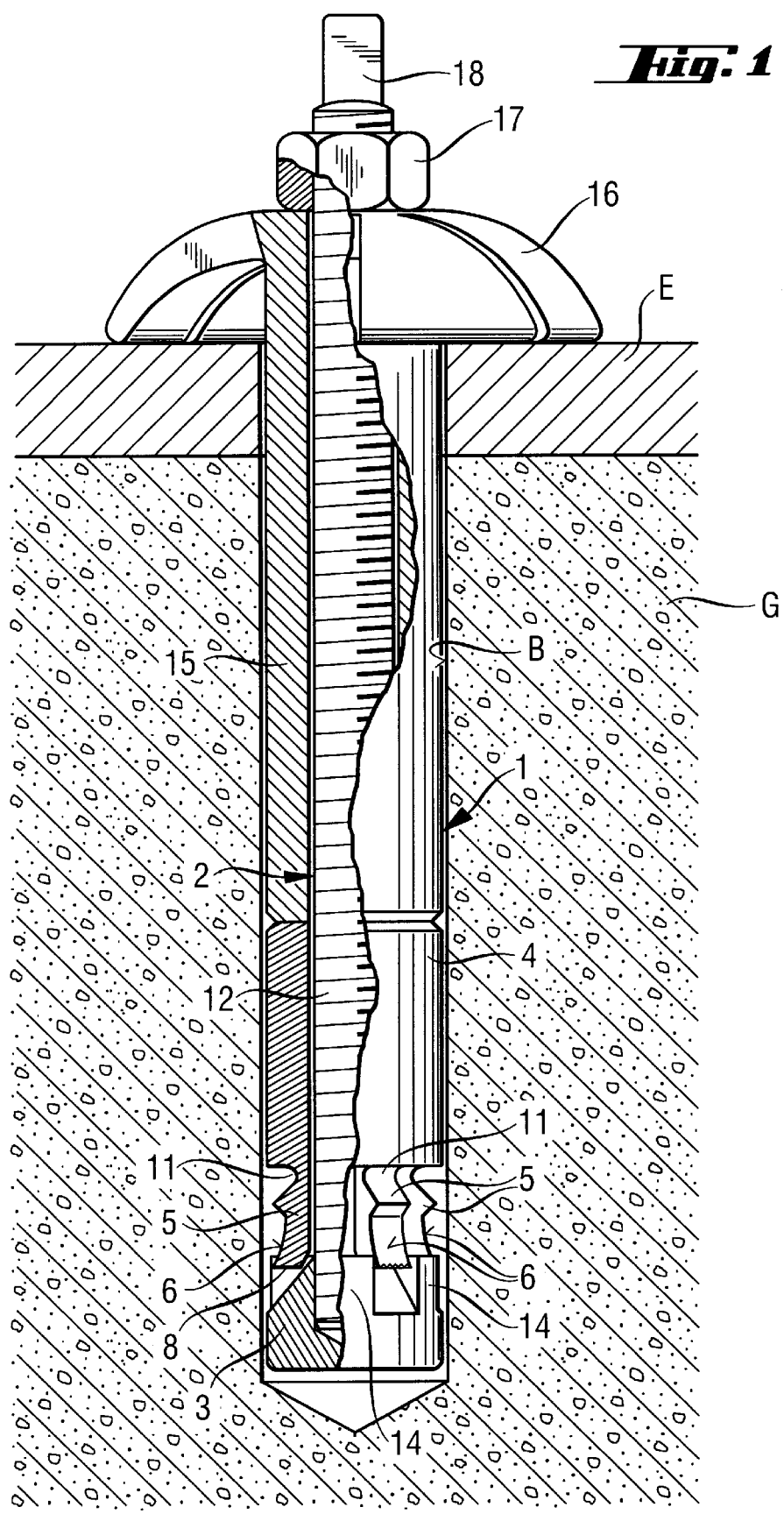

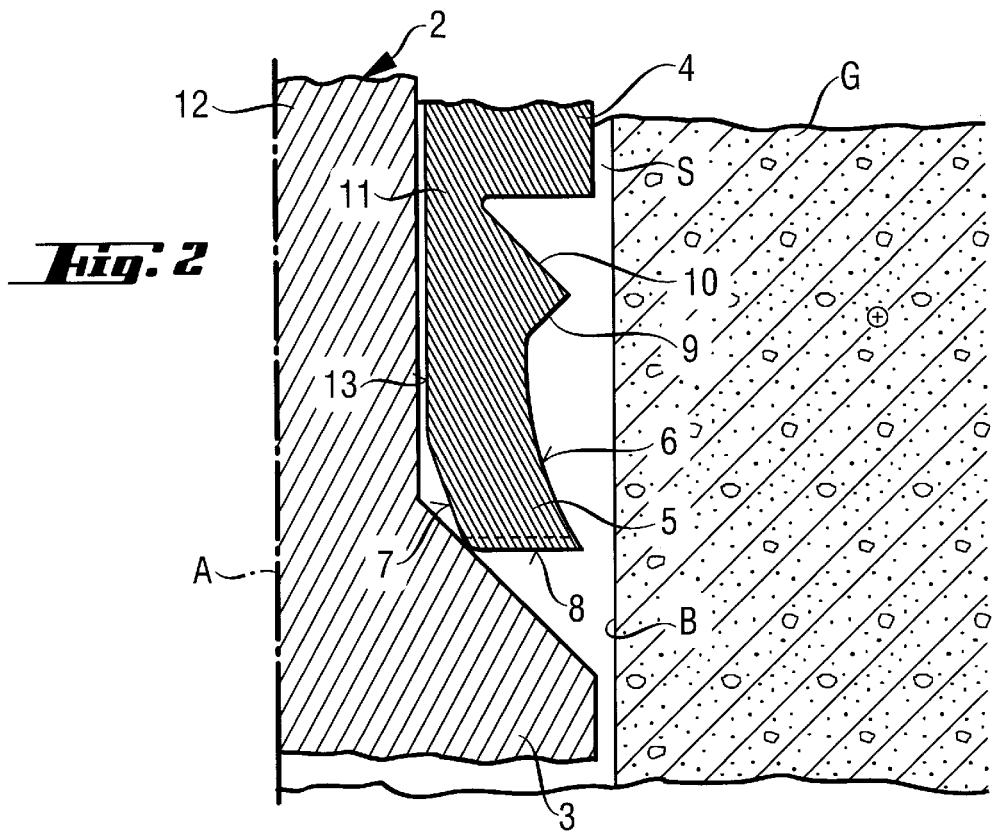
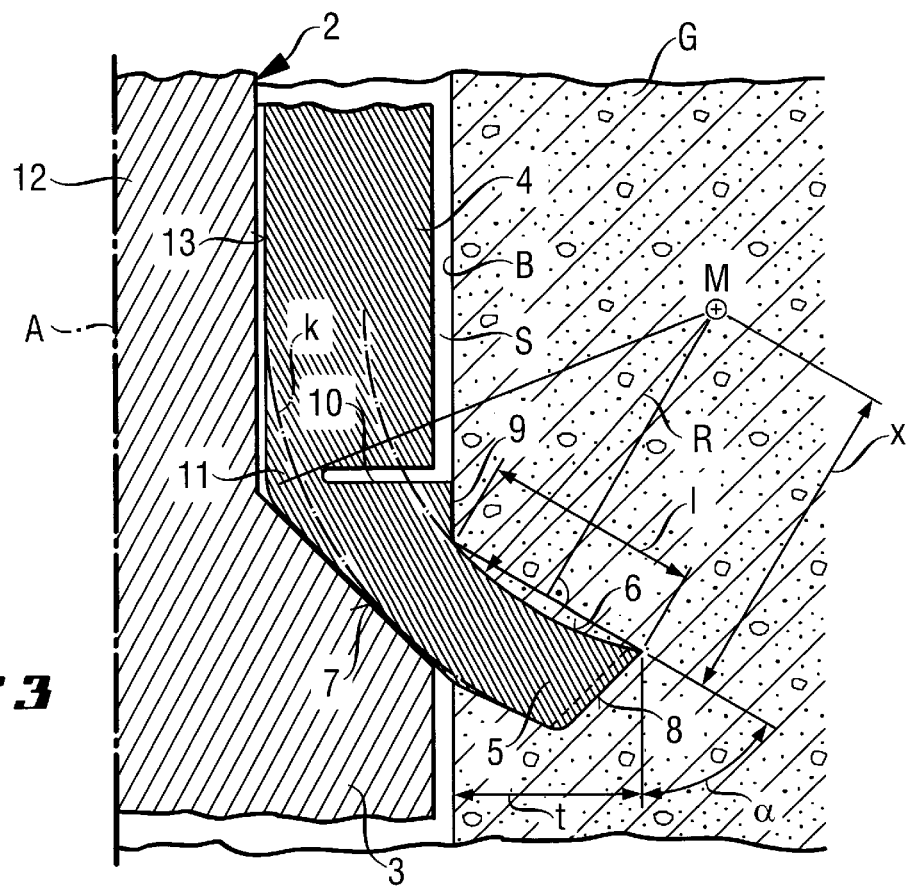

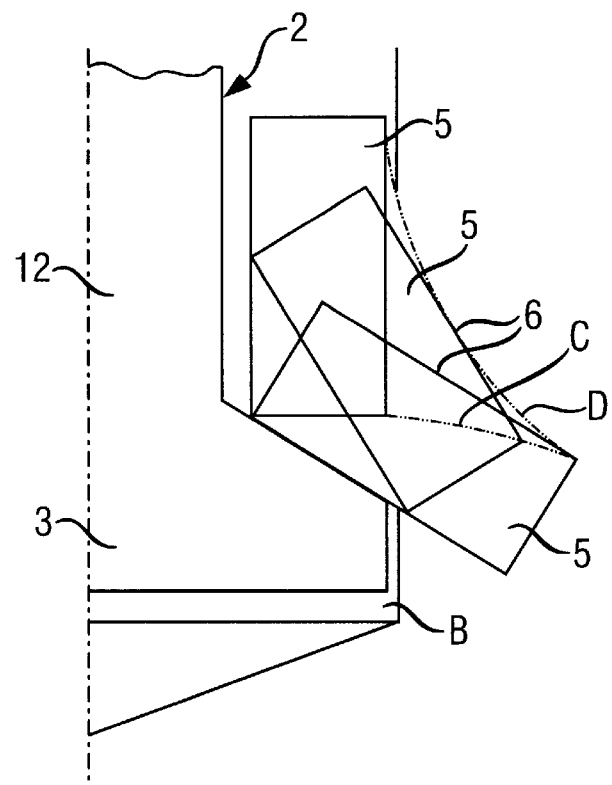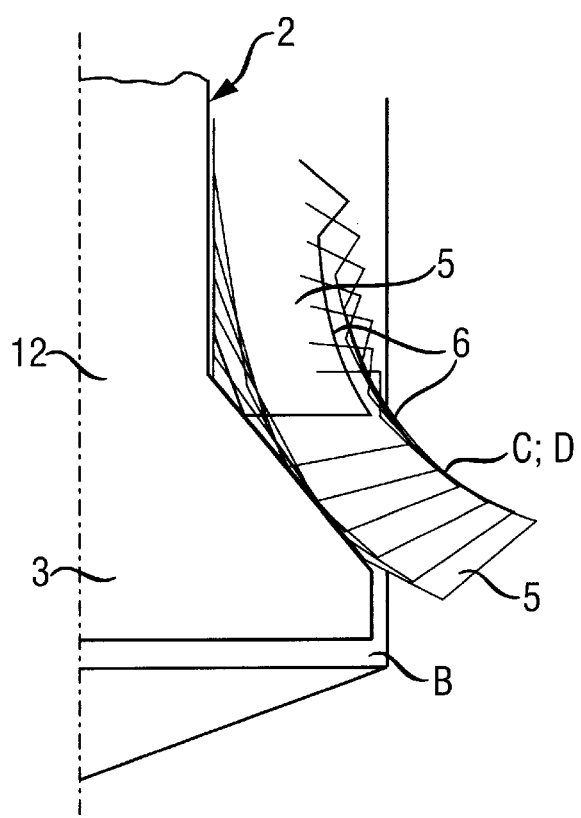

SPREADING ANCHOR

BACKGROUND OF THE INVENTION

1. Field of the Invention

The present invention relates to a spreading anchor including an anchor rod having a stem provided, at its front end, when viewed in a setting direction, with a cone widening outwardly towards its free end, and a longitudinally displaceable sleeve pushed over the anchor rod and having at its front end cutting tabs which are provided with cutters, are separated from each other by gaps, extend from a plastic hinge toward the cone, and are spread radially upon sliding of the sleeve over the cone.

2. Description of the Prior Art

In anchoring technology, it is often necessary to form connections which are expansion pressure-free to the greatest possible extent. In particular, with small edge and axis distances, the anchoring with conventional expansion dowels can result in fracture or even in stratification of the subsoil or the base material such as concrete. To prevent this, there are provided anchoring systems in which a special connection or anchoring element is form-lockingly anchored in a receiving bore. To this end, a cylindrical receiving bore is provided at a predetermined depth with an undercut. An anchoring element, which is inserted in the pre-formed bore, includes an anchor rod provided with a cone and extending through an axial through-bore of a sleeve. The sleeve is provided with expanding segments which are expanded as a result of the relative movement of the sleeve and the anchor rod.

For forming an undercut in most cases a special tool is needed, which is provided with an abrasive cutter which is eccentrically rotated in the receiving bore and with which the undercut is formed in the bore wall. Also known are spreading anchors which automatically form an undercut during the anchor setting process. Such as a self-cutting spreading anchor, e.g., is described in U.S. Pat. No. 4,702, 654 and includes a sleeve having, at its front end when viewed in a setting direction, cutting tabs extending from the plastic hinge in a direction of the cone provided at the front end of the anchor rod. The cutting tabs expand radially upon sliding of the sleeve over the cone. Due to the sleeve rotation, the cutters of the cutting tabs, which are pressed against the bore wall, mill the undercut in the bore wall. The sleeve is pressed against the cone and rotates until the cutting tabs are completely expanded, and an undercut with a desired undercut depth is formed.

A drawback of this self-cutting spreading anchor consist in that the trailing curve of the cutting tab, that is the curve course, which is described by the outer contour of the axial projection of the cutting tab during the expansion process, does not coincide with the cutting curve defined by the axial projection of the undercut. In their end position, the outer surfaces of the cutting tabs have only their outer edges engaging the undercut surface. As a result, the load is applied to the base material such as concrete not uniformly which can lead to the destruction of the base material when the load level is very high. A fairly complete all-over abutment becomes only possible after the anchor is preloaded when the ground is bridged over, and the cutting tabs are deformed. At that, the load can stress the base material which adversely affects the desirable holding values. The size of the receiving bore does not exceeds the size of the spreading anchor sufficiently enough to enable an unobstructed setting of the anchor.

The edge in the transition region between the wall of the cylindrical receiving bore and the axial surface of the undercut is spaced from the outer surface of the sleeve a distance which corresponds to the width of an annular gap between the sleeve and the bore wall. If the tensile stress in the spreading anchor is high, this edge can be sheared off. As a result, the spreading anchor is displaced, and a reliable attachment cannot be insured.

Accordingly, an object of the present invention is to eliminate the drawbacks of a prior art spreading anchor. Another object of the present invention is to provide a spreading anchor with which the load is uniformly applied to the base material to the greatest possible extent. The spreading anchor should permit an application of a high load level without the base material being destroyed in the region of the undercut. The shearing off of the edge in the transaction region between the wall of the cylindrical bore and the axial surface of the undercut should be prevented to the greatest possible extent. The construction of the spreading anchor should provide also for small axis and edge distances and, with a fractured base material, the construction of the spreading anchor should insure a reduction of the displacement into an opening fissure.

SUMMARY OF THE INVENTION

These and other objects of the present invention, which will become apparent hereinafter, are achieved by providing a spreading anchor in which an outer surface of the section of the cutting tab, which extends from the free end of the cutting tab toward the plastic hinge and remote from the cone, is formed, at least in a cutting region thereof, as a substantially toroidal surface. In particular, the present invention provides a self-cutting spreading anchor including an anchor rod having a stem provided, at its front end, when viewed in a setting direction, with a cone widening outwardly towards its free end, and a longitudinally displaceable sleeve pushed over the anchor rod and having at a front end cutting tabs which are provided with cutters, are separated from each other by gaps, extend from a plastic hinge toward the cone, and are spread radially upon sliding of the sleeve over the cone. The sections of the cutting tabs, which extend from their free ends in a direction toward the plastic hinge have an outer surface remote from the cone and formed at least in its cutting region as a substantially toroidal surface.

The formation of the outer surface of the cutting tab in its cutting region as a toroidal surface permits to conform the cutting and the trailing curve of the cutting tab to each other to a greatest possible extent. The cutting tabs occupy, during the cutting process, a definite position in the undercut, and their outer surfaces flatly abut the axial surface of the undercut due to the conformity of the trailing and cutting curves to the greatest possible extent. Thereby, the load is uniformly applied to the base material and even at a high level of the load, no destruction of the base material in the application region takes place. The uniform application of the load to the base material also improves the holding values of the spreading anchor. The geometrical shape of the cutting tabs permits to form undercuts the undercut surface of which can extend to the wall of the receiving wall at a greater angle than a conventionally obtained angle of 30°. Thereby, the allowable already small axis and edge distances of the connection points, obtainable with an attachment with a spreading anchor, can be further reduced. The larger inclination angle of the undercut surface reduces, with the already fracture base material, the displacement of the spreading anchor into the opening fissure.

A particular good conformity of the trailing and cutting curves is obtained when the toroidal surface has a center of curvature which lies on an intersection of a symmetry line of a section of the outer surface of the cutting tab, which extends into the base material, and a symmetry line of an angle formed by a transition of the stem to the cone, and wherein the toroidal surface has a radius R of curvature determined from an equation $R=[X^2+(t/2 \sin \alpha)^2]^{1/2}$. In the equation, x—is a length of the symmetry line of the section from the center to its intersection with a line defining a longitudinal extent of the section of the toroidal surface, t—is a depth of the undercut measured in a direction transverse to an axis of the anchor, and $\alpha$—is an angle of a mean inclination of the section (1) of the outer surface, which is located in the base material, to the axis. The toroidal outer surface section of the cutting tab, which extends into the undercut, defines the surface to which the load is applied.

The free end surfaces of the cutting tabs are formed as a cutting region with hardened projections, teeth, cutting inserts or the like. In the initial position, a free end surface is oriented relative to the stem axis substantially transverse. This insures that the cutters do not project beyond the sleeve circumference in the initial position of the cutting tabs. The provision of the cutters on the end surfaces of the cutting tabs aids in obtaining the greatest possible conformity of the trailing and cutting curves.

According to the invention, the cutting tab has a rear surface having a contour, which matches the toroidal surface of the section of the outer surface to a greatest possible extent and which passes into a contour of an inner surface of the sleeve which extends parallel to the axis. A curvature closest to the contour of the rear surface has a center which coincides with the curvature center of the toroidal outer surface.

The selected geometry of the rear surface approaches the ideal toroidal shell geometry to the greatest possible extent, which reduces the space requirement to a minimum. The thickness of the cutting tab remains unchanged, in particular in its cutting region.

A cost-effective formation of the rear surface to that it approaches a toroidal surface is obtained when it is formed along its longitudinal extent by sections of cylindrical and conical surfaces. The arrangement of the conical and cylindrical surface is so selected that the rear surface at least sectionwise flatly abuts the cone in the spread condition of the cutting tab. In this way, the cone provides an adequate support for the spread cutting tabs, so that the forces, which are generated when a load is applied to the cutting tabs, are directed into the cone.

In an advantageous embodiment of the invention, the toroidal outer surface of each cutting tab adjoins a shoulder, which is formed as a cylindrical surface, extends in a direction toward a circumference of the sleeve, and is connected by a connection section an outer surface of which is formed as a cylindrical surface, with the plastic hinge. The shoulder is inclined towards axis of the stem in an initial position of the spreading anchor. The connection section has a length such that the shoulder at least sectionwise projects beyond the circumference of the sleeve in a spread condition of the anchor. The shoulder, which at least regionwise projects beyond the sleeve circumference, provides for positive centering of the spreading anchor. Thereby it is insured that the undercut is produced with a uniform depth in all directions. The shoulder, which at least regionwise projects beyond the sleeve circumference, bridges the annular gap between the sleeve and the core wall. Because it abuts the bore wall, it supports the base material, in particular in the region of the circumferential edge in the transitional region between the wall and the undercut surface, which is subjected to shearing forces.

The shoulder and the connection section form in their common transitional region a right angle. This insures good absorption of the forces acting on the shoulder. In a most advantageous embodiment of the invention, the shoulder forms with the toroidal outer surface, in the initial position, an angle such that the shoulder, in the spread position of the cutting tab, extends parallel to the stem axis. The length of the connection section is so selected that the shoulder, in the expanded position of the cutting tabs, flatly lies on the wall of the receiving bore. This advantageous geometry of the cutting tab favorably influences the centering and support of the cutting tabs. In the spread condition of the cutting tabs, the shoulder flatly abuts the bore wall and annually supports the cutting tab. The connection section extends transverse to the shoulder and the axis and absorbs the forces acting on the shoulder. Simultaneously, it supports the transitional region between the cutting tabs of the sleeve and the plastic hinge and prevent the shearing off of the cutting tabs.

Particularly favorable space relationships are obtained when the shoulder forms, in the initial position, in its region remote from the stem axis, with the axis an angle which substantially corresponds to the inclination angle of the cone outer surface to the axis.

BRIEF DESCRIPTION OF THE DRAWINGS

The features and objects of the present invention will become more apparent, and the invention itself will be best understood from the following detailed description of the preferred embodiments when read with reference to the accompanying drawings, wherein:

FIG. 1 is a partial axial cross-sectional view of a spreading anchor according to the present invention;

FIG. 2 is an axial cross-sectional view of a portion of a spreading anchor according to the present invention, which contains the novel features according to the invention, in an initial condition;

FIG. 3 is an axial cross-sectional view of a portion of the spreading anchor shown in FIG. 1 with outwardly projecting cutting tabs, FIG. 4 is a diagram showing a feed path of the cutting tabs of a spreading anchor of the prior art, and FIG. 5 is a diagram showing a feed path of a spreading anchor according to the present invention which is shown in FIG. 1.

DETAILED DESCRIPTION OF THE PREFERRED EMBODIMENT

An exemplary embodiment of a self-cutting spreading anchor is designated in FIG. 1 with a reference numeral 1. As shown in FIG. 1, the spreading anchor 1 is inserted in a receiving bore B for securing a constructional element E on a base material G, such as concrete. The spreading anchor 1 includes an anchor rod 2 with a stem 12 provided, at its front end, when viewed in a setting direction, with a cone 3 which widens in a direction towards its free end. A sleeve 4 is pushed over the anchor rod 2 and is displaced along the stem 12. The sleeve 4 has, at its front end, a plurality of cutting tabs 5 spaced from each other and extending from a plastic hinge 11 in the direction toward the cone 3. The cutting tabs 5 are provided, at their free end surfaces 8, with cutters which, e.g., can be formed as hardened projections or carbide metal cutting inserts. The hardened projections can be formed as welded tips provided on the end surface 8.

They can, e.g., be welded to the end surface as piece of spring steel which are additional hardened during the welding process. The end surfaces 8 can also be provided with hardened tooth-shaped profiles.

At a rear end of the sleeve 4, there is provided a push-sleeve 15 which is displaceable along the anchor rod 2 and has an annular flange 16 which e.g., can be formed, as shown, as a spring washer-shaped member. A nut 17 is screwed on at the rear portion of the anchor rod 2, which is provided with an outer thread. The nut 17 prevents an unintended loosening of the push sleeve 15 and the sleeve 4 which is provided with the cutting tabs. Upon screwing of the nut 17 onto the anchor rod 2, the spring washer-shaped flange 16 is pressed down. At that, the push sleeve 15 is pushed in the setting direction, and the sleeve 4 is pushed downward, with the cutting tabs 5 being pushed over the cone 3 at front end of the anchor rod 2, whereby the cutting tabs 5 expand radially. The screwing of the nut 17 onto the anchor rod 2 can be effected with power means. To this end, the anchor rod 2 is provided, at its rear end, with a shank portion 18 which can be connected to a rotary drive, e.g., be inserted into a chuck of a rotary drill. The sleeve 4 is connected with the anchor rod 2 for joint rotation therewith. To this end, driver studs 14 are provided on the cone 3, which engage in spaces between respective cutting tabs 5 and transmit the rotation of the anchor rod 2 to the sleeve 4. By the rotation of the anchor rod 2 with the sleeve 4, with simultaneous spreading of the cutting tabs 5 due to displacement of the sleeve 4 over the cone 3, a desirable undercut is milled.

The cutting tabs 5 have outer surfaces 6 remote from the cone 3 and extending from the free ends of the cutting tabs 5 in a direction toward the hinge 11. According to the present invention, at least the cutting section of the outer surface 6, which, during forming of the undercut, cuts into the base material G, is formed as a torus surface. FIGS. 2 and 3 show a portion of a self-cutting spreading anchor 1, which contains novel features of the present invention, at an increased scale. FIG. 2 shows the spreading anchor 1 in an unanchored condition, and FIG. 3 shows the spreading anchor 1 in its end position, after the undercut has been formed. The length of the cutting section of the outer surface 6 of the cutting tab 5 is designated with l. The torus section has a center of curvature M which lies on the intersection of a symmetry line of the longitudinal extension l of the cutting section of the outer surface 6 of the expanded cutting tab 5, which is located in the base material G, and a symmetry line of the angle formed by a transition of the stem of the anchor rod 2 into the cone 3. The distance of the center of curvature M, which lies on the symmetry line of the extension l, and a rectilinear line, which defines the longitudinal extension l of the section of the outer surface 6 which extends into the base material G, is designated with X. The angle, which the rectilinear line l forms with the axis A of the spreading anchor, is designated with $\alpha$. The radius R of the curvature is determined from an equation $R=[X^2+(t/2 \sin \alpha)^2]^{1/2}$, wherein t is the required depth of the undercut.

As shown in FIG. 3, the rear surface 7 of the cutting tab 5, which is adjacent to the cone 3, is made with a contour similar to the contour of the outer surface 6 to a greatest possible extent. The curvature $\kappa$, the contour of which approaches that of the rear surface as close as possible, has a center which coincides with curvature center M of the toroidal surface 6. The contour of the rear surface 7 is approached to the toroidal outer surface 6 by an arrangement of cylindrical and conical surfaces, and it extends up to the hinge 11 where it passes into an inner surface 13 of the sleeve 4 which extends parallel to the axis of the spreading anchor 1. The arrangement of the cylindrical and conical surfaces is selected so that the expanded cutting tabs 5 flatly engage the cone 3 to a greatest possible extent in order to provide as good a support as possible during their loading.

FIGS. 4 and 5 show, respectively, a contour of a cutting curve C and a trailing curve D of a cutting tab 5 of a prior art spreading anchor and a spreading anchor according to the present invention. The cutting curve C designates the course of the outmost free end of the outer surface 6 of the cutting tab 5 during its expansion process. The trailing curve D is defined by the course of the opposite end region of the outer surface 6. Whereas in the cutting tabs 5 of the prior art spreading anchor, the curves C and D deviate from each other, in a spreading anchor according to the present invention, the cutting tabs of which have, according to the invention, an outer surface 6 at least the cutting section of which is formed as a torus section, the cutting and trailing curves C and D practically coincide with each other.

FIGS. 2 and 3 clearly show that the toroidal outer surface 6 passes into a peak-shaped projection which is formed by a shoulder 9 and a connection section 10 which connects the shoulder 9 with the hinge 11. The shoulder 9 extends from the toroidal outer surface 6 in a direction to a circumference of the sleeve 4 and is formed as a conical surface. In the initial position, the transitional edge between the shoulder 9 and the connection surface 10, which is likewise preferably formed as a cylindrical surface, lies within the circumference of the sleeve 4 or extends at most to the circumference of the sleeve 4. Because the transitional edge does not project beyond the circumference of the sleeve 4, it does not interfere with the insertion of the spreading anchor into the receiving bore B. The inclination angle of the shoulder 9 is so selected that the shoulder 9 bridges an annular gap S between the circumference of the sleeve 4 and the wall of the receiving bore B in the expanded condition of the cutting tabs 5 and, at least in some regions, flatly abuts the wall of the receiving bore B. In the embodiment shown in the drawings, the transitional edge between the shoulder 9 and the connection section 10 forms an approximately right angle, and the inclination angle of the shoulder 9 is so selected that the shoulder 9 extends substantially parallel to the axis A in the expanded condition of the cutting tabs 5. Preferably, the inclination angles of the shoulder 9 and the cone 3 relative to the stem 12 correspond to each other. The connection section 10 extends somewhat transverse to the axis A. The length of the connection section 10 is so selected that the transitional edge does not interfere with the expansion of the cutting tabs 5. The shoulder 9 provides for centering of the spreading anchor 1 during the formation of the undercut which insures that the undercut is formed with the same depth along the entire circumference of the receiving bore B. The shoulder 9 flatly abuts the wall of the receiving bore B and supports the bore wall above the undercut. This prevents shearing off of the base material.

Because the outer surface 6 of the expansion tabs 5 is formed as a toroidal surface in its cutting region the trailing curve and the cutting curve can be conformed to each other to a greatest possible extent. During the cutting process, the cutting tabs occupy their end position in the undercut, and their outer surfaces, due to the conformity of their cutting and trailing curve, flatly abut the axial surface of the undercut. Thereby, the load is uniformly distributed in the base material and does not cause any disturbance of the base material in the region in which it is applied. The uniform load distribution in the ground improves the desired holding values of the spreading anchor.

The geometry of the cutting tabs according to the present invention permits to form undercuts the undercut surface of which in inclined with respect to the wall of a cylindrical receiving bore at a greater angle, e.g., from 40° to 70° and, preferably, 60°. Thereby, the already small allowable axis and edge distances can be further reduced during the attachment with an inventive spreading anchor. Greater inclination angles of the undercut surface decrease the torn base material also during the displacement of the spreading anchor into a opening breach. The force distribution in the base material in the region of the undercut can be further improved, with the use of self-supported arch, when with the selected undercut angle, the inclination angle of the cone 3 relative to the stem axis lies between somewhat 30° to about 45°, in particular is 40°. The undercut depth for sizes between M4 to M30 is selected to be at least 2 mm and up to 13.2 mm, with the undercut depth increasing with the increased sizes of the spreading anchor.

Though the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A spreading anchor, comprising an anchor rod (2) having a stem (12) provided, at a front end thereof when viewed in a setting direction, with a cone (3) widening outwardly towards a free end thereof; and a longitudinally displaceable sleeve (4) pushed over the anchor rod (2) and having at a front end (8) cutting tabs (5) which are provided with cutters, are separated from each other by gaps, extend from a plastic hinge (11) toward the cone (3), and are spread radially upon sliding of the sleeve (4) over the cone (3), the sections of the cutting tabs (5), which extend from free ends thereof in a direction toward the plastic hinge (11), having an outer surface (6) remote from the cone (3) and formed at least in a cutting region thereof as a substantially toroidal surface, the toroidal surface (6) has a curvature center (M), which lies on an intersection of a symmetry line of a section (1) of the outer surface (6) of the cutting tab (5). which extend into a base material into which the spreading anchor is inserted, and a symmetry line of an angle formed by a transition of the stem (12) to the core (3), and wherein the toroidal surface (6) has a radius (R) of curvature in an as spread condition determined from an equation:

$$R=[X^2+(t/2 \sin \alpha)^2]^{1/2},$$

where x—is a length of the symmetry line of the section (1) from the center (m) to its intersection with a line defining a longitudinal extent of the section (1) of the toroidal surface (6), t—is a depth of the undercut measured in a direction transverse to an axis (A) of the anchor, and α—is an angle of a mean inclination of the section (1) of the outer surface (6), which is located in the ground, to the axis (A).

2. A spreading anchor according to claim 1, wherein the cutters, which are provided at a free end surface of the front end (8) of the cutting tab (5), extend transverse to an axis (A) of the stem (12).

3. A spreading anchor wherein comprising an anchor rod (2) having a stem (12) provided, at a front end thereof when viewed in a setting direction, with a cone (3) widening outwardly towards a free end thereof; and a longitudinally displaceable sleeve (4) pushed over the anchor rod (2) and having at a front end (8) cutting tabs (5) which are provided with cutters, are separated from each other by gaps, extend from a plastic hinge (11) toward the cone (3), and are spread radially upon sliding of the sleeve (4) over the cone (3), the sections of the cutting tabs (5), which extend from free ends thereof in a direction toward the plastic hinge (11), having an outer surface (6) remote from the cone (3) and formed at least in a cutting region thereof as a substantially toroidal surface, the cutters, which are provided at a free end surface of the front end (8) of the cutting tab (5), extend transverse to an axis (A) of the stem (12), the cutting tab (5) has a rear surface (7) having a contour, which matches the toroidal surface of the section of the outer surface (6) to a greatest possible extent and which passes into a contour of an inner surface (13) of the sleeve (13) which extends parallel to the axis, whereby a curvature (κ) closer to the contour of the rear surface (7) has a center which coincides with the curvature center (m) of the toroidal outer surface (6).

4. A spreading anchor according to claim (3), wherein the rear surface (7) along a longitudinal extent thereof is formed by sections of cylindrical and conical surfaces an arrangement of which is so selected that the rear surface (7) at least sectionwise flatly abuts the cone (3) in a spread condition of the cutting tab.

5. A spreading anchor comprising an anchor rod (2) having a stem (12) provided, at a front end thereof when viewed in a setting direction, with a cone (3) widening outwardly towards a free end thereof; and a longitudinally displaceable sleeve (4) pushed over the anchor rod (2) and having at a front end (8) cutting tabs (5) which are provided with cutters, are separated from each other by gaps, extend from a plastic hinge (11) toward the cone (3), and are spread radially upon sliding of the sleeve (4) over the cone (3), the sections of the cutting tabs (5), which extend from free ends thereof in a direction toward the plastic hinge (11), having an outer surface (6) remote from the cone (3) and formed at least in a cutting region thereof as a substantially toroidal surface, the toroidal outer surface (6) of each cutting tab (5) adjoins a shoulder (9) initially formed as a conical surface, extending in a direction toward a circumference of the sleeve (4), and is connected by a connection section (10) having an outer surface initially formed as a conical surface extending from the plastic hinge (11), and wherein the shoulder (9) is transformed in the spreading section of into a cylindrical surface extending about an axis A of said anchor rod, and the connection section (10) has a length transverse to the axis A such that the shoulder (9) at least sectionwise projects beyond the outer circumference of the sleeve (4) in the spread condition of the anchor.

6. A spreading anchor according to claim 5, wherein the shoulder (9) and the connection section (10) form a right angle in a transitional region therebetween.

7. A spreading anchor according to claim 6, wherein the shoulder (9) forms with the toroidal outer surface (6) an angle such that the shoulder (9) extends parallel to the axis (A) of the stem (12) in the spreading condition of the anchor.

8. A spreading anchor according to claim 7, wherein the shoulder (9), in the initial position of the anchor, in a region thereof remote from the axis (A) of the stem (12) is inclined to the axis (A) at an angle (1) substantially corresponding to an inclination angle of the cone (3) to the axis (A).

* * * * *